(12) United States Patent
Lam et al.

(10) Patent No.: US 8,706,160 B2
(45) Date of Patent: Apr. 22, 2014

(54) SYSTEM AND METHOD FOR DELIVERING ADAPTIVELY MULTI-MEDIA CONTENT THROUGH A NETWORK

(75) Inventors: Cory Lam, Montebello, CA (US); Chongliang Li, Chino Hills, CA (US)

(73) Assignee: Cory Lam, Montebello, CA (US)

( * ) Notice: Subject to any disclaimer, the term of this patent is extended or adjusted under 35 U.S.C. 154(b) by 1602 days.

(21) Appl. No.: 12/198,461

(22) Filed: Aug. 26, 2008

(65) Prior Publication Data

US 2009/0061927 A1  Mar. 5, 2009

Related U.S. Application Data

(60) Provisional application No. 60/968,141, filed on Aug. 27, 2007.

(51) Int. Cl.
*H04M 1/00* (2006.01)

(52) U.S. Cl.
USPC ..................................... 455/556.1; 455/552.1

(58) Field of Classification Search
USPC .............. 455/556.1, 552.1, 414.1–414.4, 455/418–419, 466; 709/223
See application file for complete search history.

(56) References Cited

U.S. PATENT DOCUMENTS

| | | | |
|---|---|---|---|
| 7,450,954 B2 * | 11/2008 | Randall | 455/456.1 |
| 2006/0177005 A1 * | 8/2006 | Shaffer et al. | 379/67.1 |
| 2006/0179127 A1 * | 8/2006 | Randall | 709/219 |
| 2007/0094374 A1 * | 4/2007 | Karia et al. | 709/223 |
| 2009/0170557 A1 * | 7/2009 | Chauhan et al. | 455/552.1 |

* cited by examiner

*Primary Examiner* — Marcos Torres
*Assistant Examiner* — Sowmini Nair
(74) *Attorney, Agent, or Firm* — Wang Law Firm, Inc.; Li K. Wang; Stephen Hsu

(57) ABSTRACT

A multimedia multimodal dynamic user interface for mobile/wireless devices is introduced in present invention. With this mechanism, service providers can offer rich user oriented applications and they have the freedom to explore new applications easily. A voice call path and a data path are setup for each call request to support the user interface and the device information is sent to a server during the call setup procedure. The user interface offers virtual user to user interaction by integrating multi-media with multi modal interactions. A user may enter inputs through multiple modals and inputs are synchronized and delivered to a server for processing.

8 Claims, 6 Drawing Sheets

SYSTEM AND METHOD FOR DELIVERING ADAPTIVELY MULTI-MEDIA CONTENT THROUGH A NETWORK

RELATED APPLICATION

This application claims benefit of U.S. Provisional Patent Application No. 60/968,141, titled "System and Method for Delivering Adaptively Multi-Media Content Through a Telecommunication Network," filed on Aug. 27, 2007, the specification of which is incorporated here in its entirety.

FIELD OF THE INVENTION

The present invention relates to telecommunication, more specifically to delivery of multi-media content in through a telecommunication network.

BACKGROUND OF THE INVENTION

Mobile devices, such as mobile telephone, Blackberry, and other similar devices, are becoming an essential element in daily life. These devices are no longer simple communication devices anymore. Besides using a mobile device as a radio telephone, people are using them to access information on the Internet, sending text messages to each other, playing games, etc. These different usages provide new opportunities for service providers to increase their revenue through new service offerings.

When a service provider wants to offer a new service, usually the service provider determines a new service to be offered, and then issues a requirement for the mobile device manufacturers, so new mobile devices capable of supporting new features can be manufactured. The service provider relies on the mobile device manufacturers to deliver the new service.

The services provided by the service providers, such as telephone service, electronic mail service, web browsing service, game service, etc, use the capabilities of the mobile device. The service is delivered to one user interface medium and inputs from the user are received from another user interface medium, and this single interface medium approach limits the user experience that can be provided to a user.

Enabling the service providers to easily offer new services that allow users to have a full experience through easy multi-media interface has been one of objectives of all service providers and it is to such capability the present invention is directed to.

SUMMARY OF THE INVENTION

A system for providing an interactive delivery of multi-media content from a server to a mobile device through a network is provided. The system comprises a server having multi-media content and a mobile device capable of receiving the multi-media content from the server. The mobile device is capable of making a call setup for a concurrent voice call and data call, informing the server about communication capabilities of the mobile device during the call setup, and receiving concurrently at least two different types of user input data.

In another embodiment, a multi-media server for interacting with mobile devices is provided. The server comprises an external interface for interfacing with the mobile devices, a storage unit for storing multi-media contents and applications, a text-to-speech unit for converting text content into audio content, a script engine for executing a application requested by a user at a mobile device, and a controller for interpreting service requests received from the user, determining input capabilities supported by the mobile device, and retrieving an application corresponding to the requested service.

In yet another embodiment, a user device for communicating with a server is provided. The user device comprises a radio interface for interfacing with a remote server, a display screen for displaying graphical images to a user, an audio unit for playing audio messages to the user and for receiving input messages from the user, a keypad unit for receiving input from the user, and a controller for receiving instructions from the remote server and for transmitting requests to the remote server, wherein the controller capable of making a call setup for a concurrent voice call and data call and informing the remote server about communication capabilities of the mobile device during the call setup.

In yet another embodiment, a method for delivering a multi-media service to a mobile device is provided. The method includes receiving a request for a call setup for a concurrent voice call and data call for a multi-media service from the mobile device, determining communication capabilities of the mobile device, retrieving an application associated with the multi-media service, and transmitting multi-media media content associated with the multi-media service to the mobile device.

In yet another embodiment, a method for a mobile device supporting a number of input modalities to provide a multi-media service to a user is provided. The method includes receiving a request for the multi-media service from the user, transmitting a call setup request for a concurrent voice call and a data call to a server, receiving multi-media content from the server, displaying multi-media content to the user, receiving user inputs from at least two input modalities, and transmitting the user input to the server.

DESCRIPTION OF THE DRAWINGS

Features and advantages of embodiments of the invention will become apparent as the following Detailed Description proceeds, and upon reference to the Drawings, where like numerals depict like elements, and in which.

DETAIL DESCRIPTION OF THE INVENTION

Figure 1:
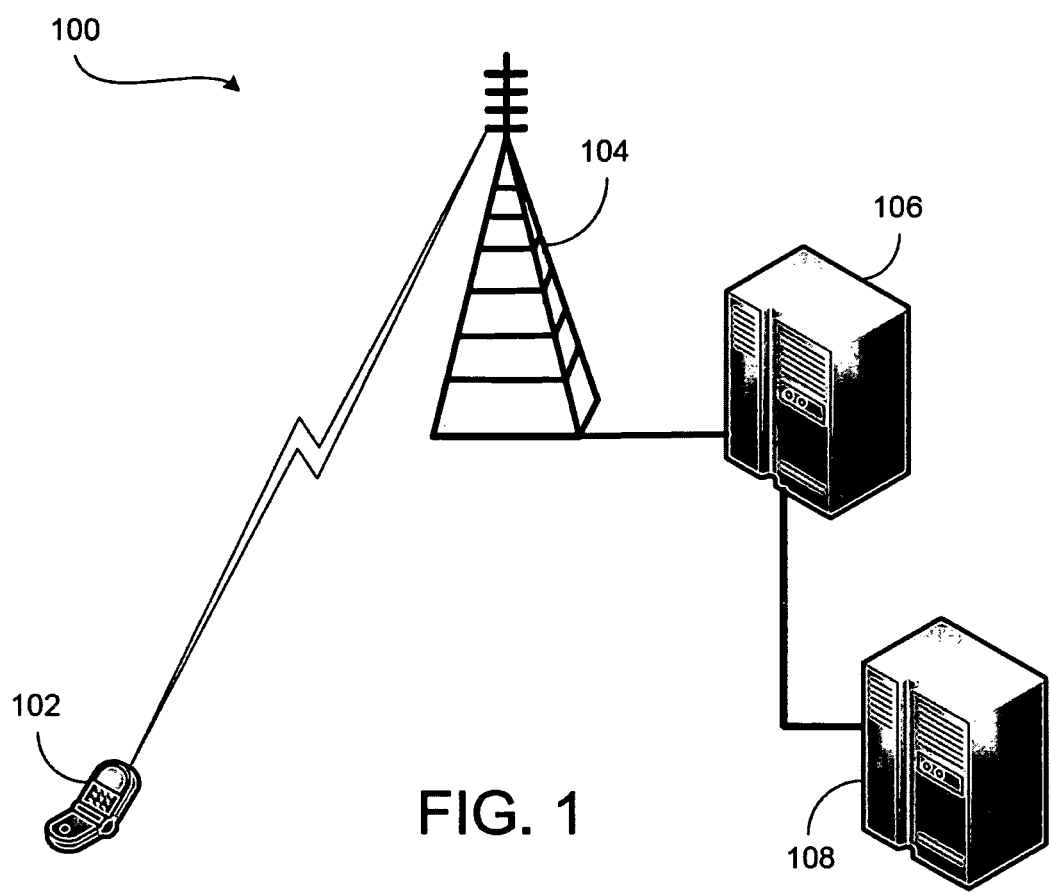
FIG. 1 illustrates architecture of a telecommunication network supporting the invention.

The present invention relates to a system for delivery of new service from a network server to an end user in a telecommunication environment. The system includes a server software and a client (mobile device) that incorporates a specialized client software. The system has the requisite data processing and transformation functional modules in the server side to provide instructions to the client on what multi-media information to present to user. FIG. 1 depicts a telecommunication network 100 that supports the present invention. The mobile device 102 is in communication with a base station (BS) 104. The BS 104 communicates with a mobile switching center (MSC) 106 and the MSC 106 is in communication with an application server 108. The BS 104 receives communication from the mobile device 102 and transmits the received communication to the MSC 106. If the communication relates to a special service provided by the client server 108, the received communication will be sent to the application server 108. If the communication does not relate to a service provided by the application server 108, the received communication will be forwarded by the MSC 106 to a different server (not shown) for handling.

Figure 2:
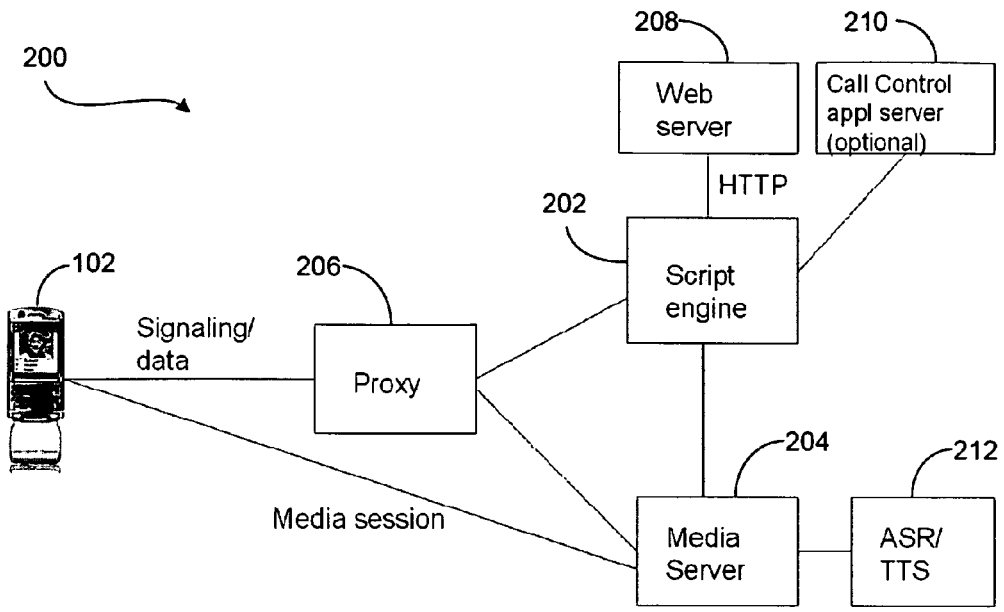
FIG. 2 depicts a system architecture of the invention.
Figure 3:
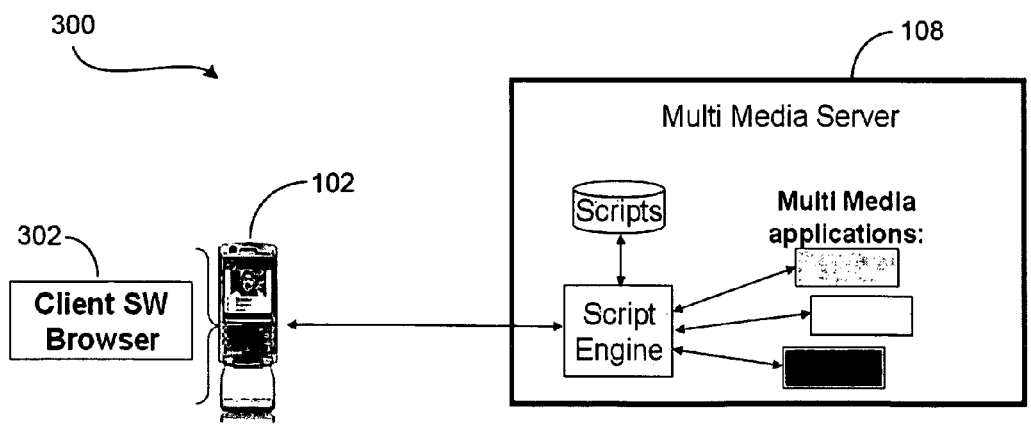
FIG. 3 depicts a high level view of the invention.

The system according to the invention enables a service provider (e.g. a telephone company) to provide new multifunctional services to mobile telephone users. The multifunctional services refer to services like directory assistance, checking account balance, calling help desk, operator assistance, a portal or road-side assistance, etc. FIG. 2 is a system architecture 200 according to the invention. The mobile device 102 sends a request for a specialized service to the application server 108. The application server 108 may include an interfacing software (proxy) 206, a script engine 202 and a media server 204. These elements may also be located in physically separate machines. The proxy 206 interprets the request and requests the script engine 202 to retrieve a script (application) related to the requested service from the web server 208. If the application involves call control and the script engine may engage a call control application server 210. The script engine 202 will execute the application along with multi-media data and may also instruct the media server 204 to process the multi-media data. Some data maybe processed by the media server 204 before transmitting to the mobile device 102. For example, text data may be converted to speech through a text to speech (TTS) unit 212. After the session for the application is established, the mobile device 102 may communicate directly with the script engine 202 by passing the proxy 206. FIG. 3 illustrates a high level view 300 of a multi-media service being provided to a mobile device 102. The client application may be a specialized browser 302 in the mobile device 102. The mobile device 102 communicates with a client server 108 that may be located remotely. The server 108 provides services requested by the mobile device 102. The services may involve delivering multi-media data related to multi-media applications to the mobile device 102.

Figure 4:
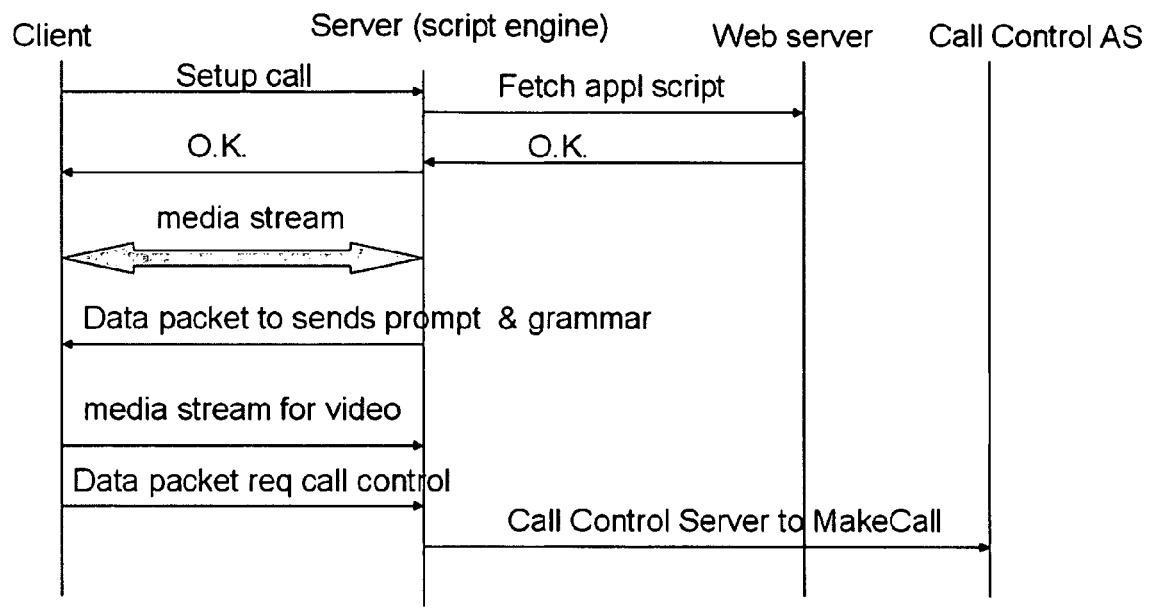
FIG. 4 depicts a sequence diagram for interface between a client device and a server.

FIG. 4 depicts a sequence diagram 400 for interface between a client device 102 and a server 108. The activation of a particular service is similar to a telephone call setup. The client on the mobile device 102 initiates communication with a server 108 by sending a call setup request for a specific service. The call setup request can be implemented using the Session Initiation Protocol (SIP), in particular using a SIP INVITE message. The above approach is to make use of user's familiarity with making phone call, so there is no training requires for using the new service. The call setup may also be hidden from the user by offering an application (service) icon on the user interface screen of the mobile device 102 for the user to select.

Similar to traditional interactive voice response (IVR) service like 411, the server 108 will activate a script execution engine 202 that will retrieve and start executing the specific application script. The server 108 may send multi-media data to the client device 102, as part of delivery of the requested service, through media stream established between the client device 102 and the application server 108. In a traditional IVR system, the script may call out to play a prompt like "what city?" to request the user to say the city name. With this invention, the script can call out a video that plays on the user's device 102, so the user can see an operator on the screen asking for the city information. The script also can cause a text to be sent to the client device 102 through data packets to display on the mobile device 102 similar to caption on a TV screen. Other option includes personalization, since the server knows the device identification, the script can retrieve subscriber information from a user database and prompt the user as follows "hi, Mr. John Bennett, what city please?" This invention allows the application to utilize the full multimedia capability of the mobile device 102 to interact with the user.

Alternatively, the call could also be initiated by the server based on other event triggers to the script engine. A script could be loaded to run based on time scheduling or other API call to the script engine. For example, a user may sign up for a stock market information service that delivers a preselected set of information to the user's mobile device 102 and the user may take actions accordingly. The script may also be loaded to run based on user's geographical position if the mobile device is equipped with a GPS device. Upon learning that user is near a particular store, the application server 108 may load an application that displays current promotions from that store and the user may accept the promotions and then enters the store to redeem his selected promotions.

During the delivery of the requested service, the mobile device 102 may also send call control related data packets to the server 108 and these data packets will be forward to the call control application server 210.

Besides displaying text on a user interface screen on the mobile device 102, the application can also display GUI controls, such as text box, list box, radio buttons, etc., which will enhance the data entry capabilities on the web browser on the mobile device 102. This allows the user to input request via different modalities. One can choose by giving a voice command, by providing dual-tone multi frequency (DTMF) signals via the device dial pad, by inputting information via a user interface screen (touch screen), or by entering text via a keyboard. This ability to do input with different modalities is called multi-modal.

By implementing based on a call analogy where the client uses a "making a call" action to request a service, the client application and the server application may set up multiple communication sessions with different communication protocols to support signaling session, data interaction, and media session. The data interaction can be different data streams that ride on a signaling session. The media session can carry voice, video, and DTMF streams. This call analogy can be hidden from the user by requiring the user to click on certain link or button on the client's GUI. The start of a service can also be initiated by the server instead of by the client.

The system according to the present invention allows a user to choose from any one of the communication modes to respond back. The user can also choose to mix different modals. Thus, the system's dynamic user interface and rich interaction provide a very user friendly and highly effective mechanism for user to use the services. The system of the present invention aides a phone users who may be driving and have to use hands free operations and can also support many different types of devices to request the same service. The system is network agnostic and can be deployed for cellular based network and devices, wireless (like WiFi, WiMax) or satellite (like road side assistance system or direction assistance system in automobiles) based network, or wired network like kiosk in airports and hotels.

The client application is embedded preferably as firmware in the mobile device 102. This client application renders the dynamic user interface based on instructions received from the server 108. This client application may have video player component, graphical display components, and user GUI controls like text box, list box, radio buttons, etc. The client application also handles the communication, such as supporting call control, audio streaming and video streaming. The server application includes all the multimedia services and multimodal capabilities tied together by a service creation engine. The service creation engine processes applications written in script language.

When a user makes a call for a service, the mobile device sends a request to the server through a message such as SIP INVITE. The server will acknowledge the request and the appropriate service will be activated by the server. Automatic negotiation will be performed between the mobile device and the server so that the capabilities of the mobile device are determined. This determination can use messages based on session description protocol (SDP) with extension to specify multi-modal capabilities and multi-media capabilities. The server can run different part of the application depending on the device capabilities. The application may instruct the mobile device what graphical interface to display, what video, or what recording to play via the server framework. The instructions may be sent as part of the SIP INFO message in the SIP signaling session.

A user can interact with the mobile device using voice, key input, and other modal that is available to him. To allow the user the flexibility in interacting with any modality he chooses for a response, the different modalities are active at the same time and are synchronized. Synchronization is done via time-stamping the messages and also by having interlocking mechanisms in both mobile device and server. By having the server to specify what input controls to offer to any specific type of mobile device, the mobile device can also help support interlocking for synchronization. For a single dialog, it can be specified by the server whether to allow mixed modal input or single modal input for that dialog. If it is single modal input, the minute the mobile device detects the user inputting via one input modal, the other input modals can be disabled for that dialog. For the GUI display, the server informs the mobile device what to display and what controls are available to the user. So the server can instruct the mobile device to disable other input modality when an input has been detected on one input modality. For example, if the touch screen is pressed, the mobile device can ignore DTMF input for that particular dialog if instructed by the server. This is interlocking on the mobile device side. The server can also chooses to receive multiple inputs at the same time and based on the script logic and timestamp to determine what actions to follow. Alternatively, the disabling of other input modality may also be accomplished by the mobile device itself after detecting a first input from one modal.

Since the server controls both the video streaming and the text to speech (TTS) module and supports audio mixing, the server can be scripted to play video to the mobile device but only send audio from the TTS module to the mobile device. This allows the same video to be played with personalized greetings. For example, when user A calls, the video would play and announced "Hi, Mr. A, how can I help you?" and when user B calls, the same video would play but the announcement would be "Hi, Mr. B, how can I help you?"

With the multi-media and multimodal capabilities built into the mobile device and the server, applications to provide different services, such as video response service, audio response service, game services, video on demand, interactive mobile TV, and phone action services (call center, help desk, etc.).

Prior art multi-modal implementations only address speech and text in an IVR type usage where speech and text do not need to be synchronized. The addition of video and other input modal also requires tighter synchronization between client and server. In addition, to support many device types, the mobile device capability negotiation allows the application to address the different device types with customized interactions. Knowing the mobile device capabilities also allows the service to dynamically create different modal (presentation and input methods).

Present invention thus provides an added dimension for service delivery by a service provider. The service can be a portal, a contact center, a help desk, a directory assistant service, etc. T the invention is network agnostic and not limited to mobile/wireless device in the usual sense. It can be used in an automobile for the automobile's road side assistance system or driving assistance program. It can also be used in hotel or airport kiosk, etc. What it offers is a very user friendly interaction system that also has the added human touch by playing a video that shows that there is someone providing the assistance. This is very important in certain applications to comfort and provide the assurance for the users.

Figure 5:
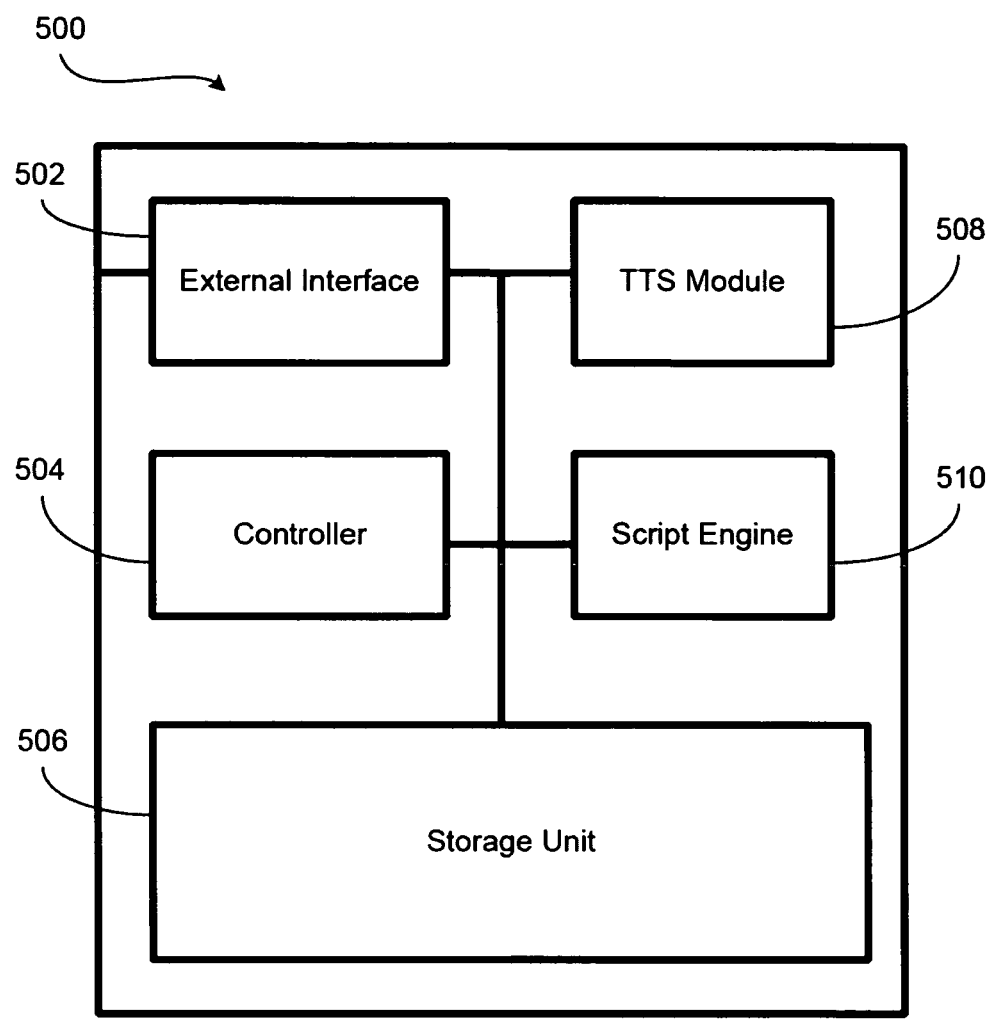
FIG. 5 depicts architecture of a server according to the invention.

FIG. 5 illustrates architecture of a server according to the present invention. The server includes an external interface 502, a controller 504, a storage unit 506, a TTS module 508, and a script engine 510. The external interface 502 enables the server to communicate with a user at a mobile device through a network. The TTS module 508 is capable of translating a text script to an audio. The controller 504 controls the interface with the mobile device and controls the delivery of services to the mobile device. The controller 504 retrieves the application corresponding to the requested service and delivers to the script engine 510 for delivery. The script engine 510 delivers the service to the mobile device along with multimedia content stored in the storage unit 506. Those skills in the art will appreciate that the controller 504 and script engine 510 may be a single physical device that performs different functions.

Figure 6:
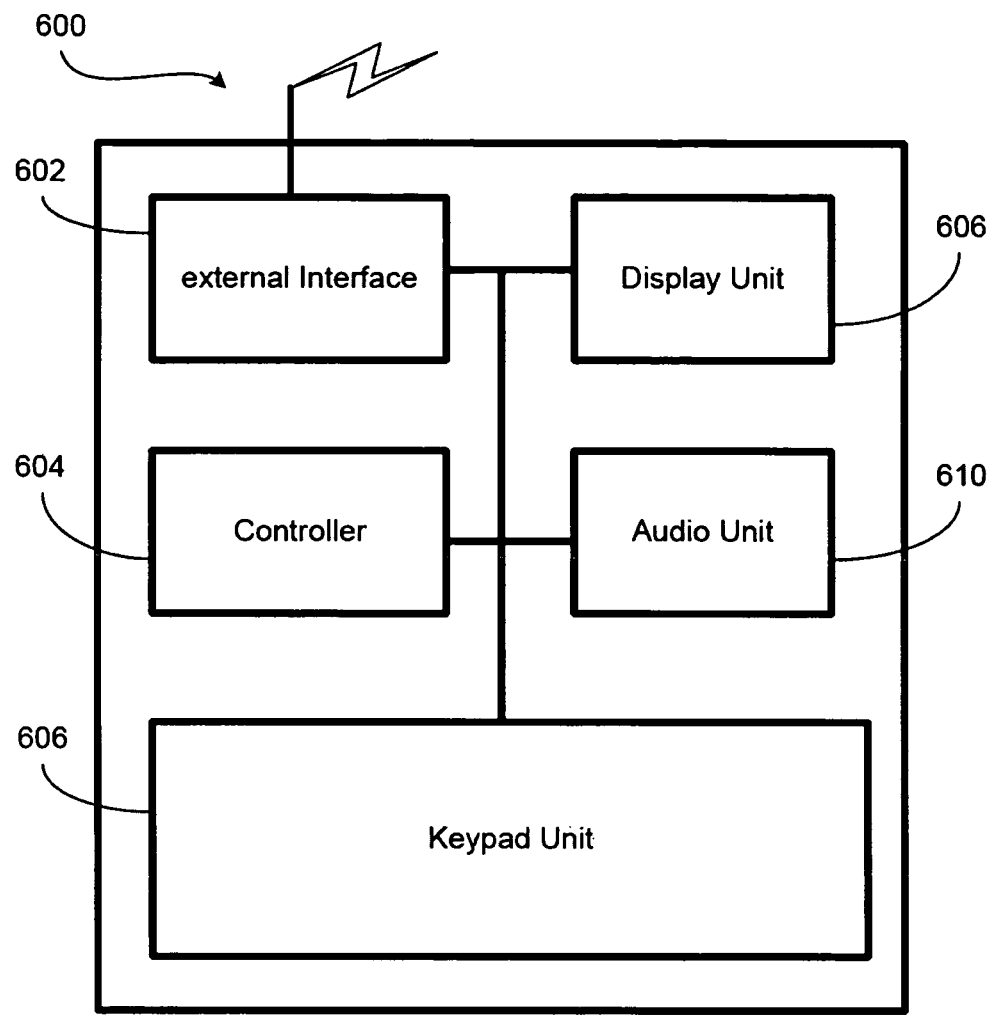
FIG. 6 depicts architecture of a mobile device according to the invention.

FIG. 6 illustrates a mobile device according to the invention. The mobile device includes an external interface 602, a display unit 606, an audio unit 610, a keypad nit 606, and a controller 604. The external interface 602 may be a radio interface for interfacing with the server through a wireless network and alternatively may be a network interface for interfacing with the server through a wired connection. The controller unit 604 receives the instructions and multi-media contents from the server; the controller 604 may also receive service requests from the user. The keypad unit 606 controls the keyboard, keypad, touch screen, or other keyboard-like devices. The audio unit 610, besides playing audio to the user, may also take input from the user. When instructions and multi-media content are received by the mobile device, the controller 604 instructs the display unit 606 to display the video to the user and the audio unit 610 to play audio to the user. The user may interact with the requested service by entering his input through the keypad unit 606 or a microphone controlled by the audio unit 610. The controller 604 is capable of responding to an inquiry regarding the modality of the mobile device, i.e., the controller 604 will be able to indicate to the server its communication capability or number of input modalities the mobile device is capable of supporting. The controller 604 is capable of determining which input modality received the first user input and then turning off other input modalities. Alternatively, the controller 604 may also turn off input modalities according to instructions received from the remote server.

Figure 7:
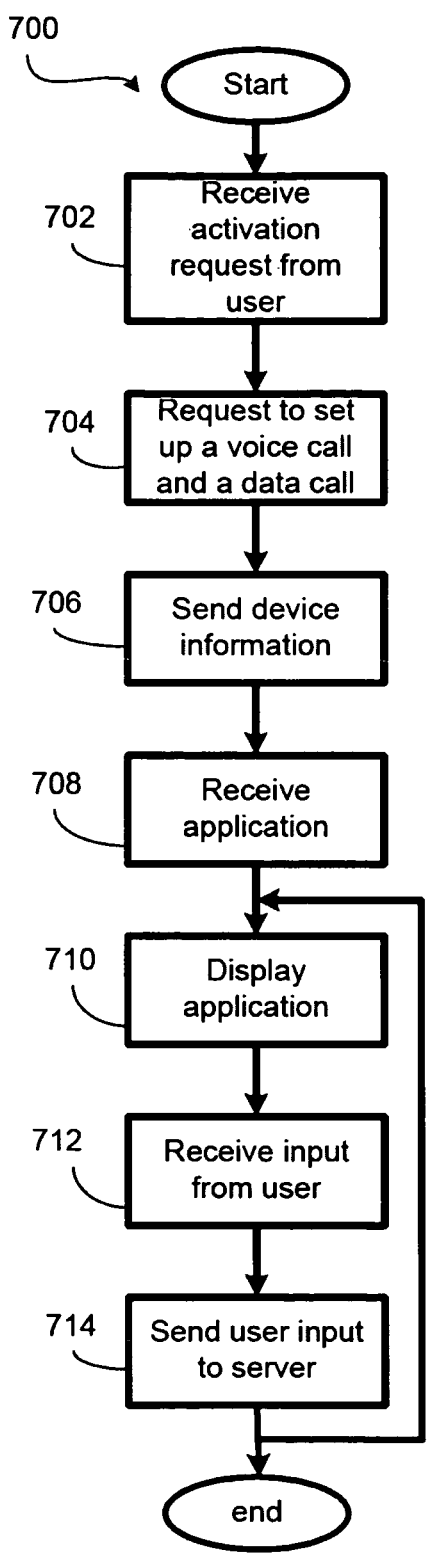
FIG. 7 depicts a client process according to one embodiment of the invention.
Figure 8:
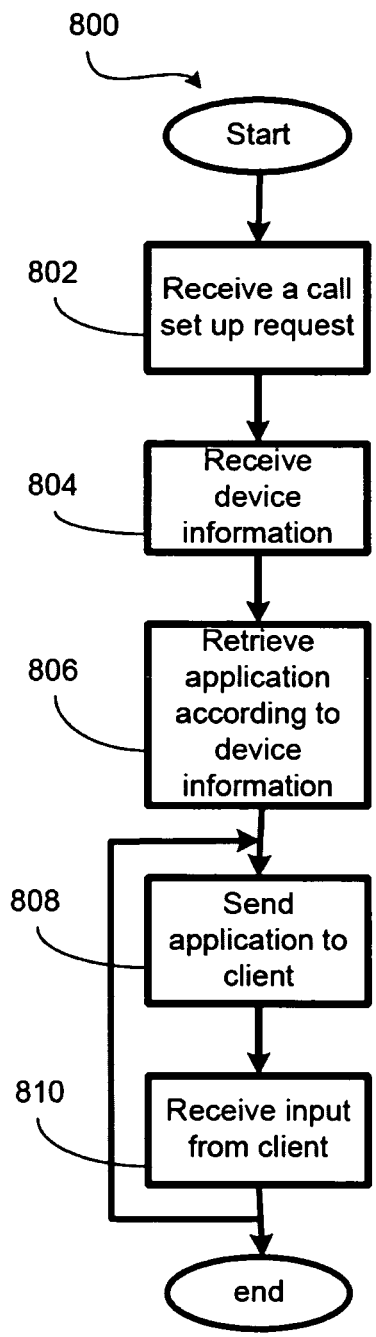
FIG. 8 depicts a server process according to one embodiment of the invention.

In operation, a wireless service provider may decide to provide a new service of purchasing a lottery ticket to mobile phone users. To deliver this new service to the mobile phone users, the wireless service provider does not need to ask the mobile device manufacturers to design new applications to be loaded onto each mobile device. The wireless service provider can has its own technical staff to devise a lottery application that can be delivered to the mobile device users. When a mobile device user wants to purchase a ticket for a lottery game that allows the buyer to pick his own number, the mobile device user can request the lottery purchasing service either by selecting it from a menu or by announcing his request to the mobile device. FIGS. 7 and 8 depict a client process and a server process respectively when the user actives a service such as a multi-media lottery game.

After the user selects the multi-media lottery game application, the activation request is received by the mobile device, step 702, the mobile device sends a call setup request to the server. The call setup is for setting up concurrently a voice call path and a data call path, step 704, and with this call setup an interactive voice communication can be established between the mobile device and the server besides transfer of data between them. As part of the call setup, the mobile device sends the device information to the server, step 706. The device information such as audio capability, video capability, screen resolution, color depth, touch screen availability, GPS availability, network connectivity capabilities, etc. The information can be embedded, for example, in an optional field of a SDP message.

The call setup request is transmitted to a server through a wireless communication network. The server receives the call setup request, step 802, and the device information, step 804. The server can determine the communication capability of the mobile device based on the device information received. The server interprets the service request and instructs the script engine to retrieve and execute the application corresponding to the requested service, step 806. The script engine will also retrieve multi-media content associated with the requested service and sends the multi-media content along with instructions to the mobile device, step 808. The mobile device receives the multi-media content of the requested application, step 708, and displays it according to the instructions received, step 710. The mobile device will display a screen of numbers and other graphic information for the user to select. The mobile device may also display a video about the lottery and may also announce, "please select your numbers" through the audio device.

Because both a voice path and a data path are established between the mobile device and the server, the user has the option of entering his numbers by speaking them to the microphone as in an interactive session, step 712. Alternatively, the user may also input the numbers through a touch screen or entering them through the keypad. The user may also mix the input methods, i.e., entering some numbers via audio input and other number via text input. The mobile device will transmit the numbers to the server, step 714, and the server will receive the user input, step 810. For certain applications, the process of sending application data to the client and receiving input from the client and the process of receiving the application data from the server, displaying the application data, and receiving and sending the user input to the server may be repetitive, as shown in FIGS. 7 and 8, until the user terminates the application. For the lottery application, the server may send an email confirmation to user's email address or a text message to user's mobile device via short message service (SMS). The numbers will be sent to the server and synchronized via time stamps, so the server will know which number is the first number and which number is the last number.

Though the descriptions above use the scenario of a mobile device communicating with a remote server, the invention is equally applicable to situations where a user interface device is directly attached a server, such as a navigation device installed on an automobile. The navigation device is equipped with multiple input modals and user can interface with the navigation device through any one of the input modals.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, alternatives, and combinations of features shown in the above description are also possible. Accordingly, the claims are intended to cover all such equivalents. Dimensions in the drawings here presented are not to the scale unless otherwise indicated.

What is claimed is:

1. A system for delivering interactively multi-media content from a server to a mobile device through a network, comprising:
   a server having multi-media content and in communication with the network; and
   a mobile device, in communication with the network and receiving the multi-media content from the server through the network,
   wherein the mobile device sends a call setup request for a concurrent voice call and multi-media data call to the server, sends, to the server, communication capabilities of the mobile device during the call setup, and receives concurrently at least two different types of user input data,
   wherein the server determines the communication capabilities of the mobile device and selects a multi-media content according to the communication capabilities of the mobile device,
   wherein the at least two different types of input data is synchronized at the server through time-stamping messages, and
   wherein the mobile device further comprises at least two types of user input device and receives a first user input data from a first input device and disabling a second input device.

2. The system of claim 1, wherein the mobile device further being capable of transmitting the at least two different types of user input data to the server.

3. A multi-media server for interacting with a mobile device, comprising:
   an external interface for interfacing with the mobile device;
   a storage unit for storing multi-media contents and applications;
   a text-to-speech unit for converting text content into audio content;
   a script engine for executing a application, selecting a multi-media content according to input modalities supported by the mobile device, and delivering the multi-media content associated with the application to the mobile device through the external interface; and
   a controller for receiving an event trigger, determining input capabilities supported by the mobile device, retrieving an application from the storage unit in response to receiving the event trigger, receiving inputs of different modalities from the mobile device, and instructing the mobile device to disable other input modalities after a first input is received from the mobile device.

4. The multi-media server of claim 3, wherein the event trigger being one of the following group: a request for call setup for a concurrent voice call and data call from the mobile device, a geographical location based event from the mobile device, and a time-based event.

5. A user device for communicating with a server, comprising:
 a radio interface for interfacing with a remote server;
 a display screen for displaying graphical images to a user;
 an audio unit for playing audio messages to the user and for receiving input messages from the user;
 a keypad unit for receiving input from the user; and
 a controller for:
  receiving instructions from the remote server,
  receiving simultaneous different user inputs from different input modalities,
  determining an input modality associated with a first input from the user and turning off other input modalities,
  generating a trigger event,
  informing the remote server about communication capabilities of the mobile device,
  turning off input modalities according to instructions received from the remote server, and
  transmitting the triggering event to the remote server, wherein the trigger event being a call setup for a concurrent voice call and data call or a geographical location based event.

6. The user device of claim 5, wherein controller further being capable of communicating the number of input modalities of the user device to the remote server.

7. A method for delivering a multi-media service to a mobile device, comprising the steps of:
 receiving, at a server, a trigger event, from the mobile device, for a call setup for a concurrent voice call and data call for a multi-media service;
 receiving inputs from at least two input modalities from the mobile device;
 determining input modalities supported by the mobile device;
 determining, at the server, communication capabilities of the mobile device;
 retrieving the application according to the input modalities supported by the mobile device;
 retrieving an application associated with the multi-media service;
 transmitting multi-media media content, to the mobile device, associated with the multi-media service;
 instructing the mobile device to turn off selected input modalities, and
 wherein the trigger event is a user-initiated request or a geographical location-based request.

8. A method for a mobile device supporting a number of input modalities to provide a multi-media service to a user, comprising the steps of:
 receiving a request for the multi-media service from the user;
 transmitting a call setup request for a concurrent voice call and a data call to a server;
 receiving multi-media content from the server;
 displaying multi-media content to the user;
 transmitting the number of input modalities supported by the mobile device to the server;
 receiving user inputs from at least two input modalities;
 receiving instructions from the server to turn off selected input modals;
 turning off the selected input modals; and
 transmitting the user input to the server.

* * * * *